US011561706B2

(12) United States Patent
Mulholland et al.

(10) Patent No.: US 11,561,706 B2
(45) Date of Patent: Jan. 24, 2023

(54) STORAGE ALLOCATION ENHANCEMENT OF MICROSERVICES BASED ON PHASES OF A MICROSERVICE RUN

(71) Applicant: International Business Machines Corporation, Armonk, NY (US)

(72) Inventors: Miles Mulholland, Eastleigh (GB); Lee Jason Sanders, Chichester (GB); Keira Louise Hopkins, Eastleigh (GB); Jason Hughes, Hayling Island (GB); Adam Michael Farley, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 16/689,121

(22) Filed: Nov. 20, 2019

(65) Prior Publication Data

US 2021/0149571 A1   May 20, 2021

(51) Int. Cl.
*G06F 3/06* (2006.01)
*G06N 20/00* (2019.01)

(52) U.S. Cl.
CPC ............ *G06F 3/0631* (2013.01); *G06F 3/061* (2013.01); *G06F 3/0653* (2013.01); *G06F 3/0683* (2013.01); *G06N 20/00* (2019.01)

(58) Field of Classification Search
CPC ...... G06F 3/0631; G06F 3/061; G06F 3/0653; G06F 3/0683; G06N 20/00
See application file for complete search history.

(56) References Cited

U.S. PATENT DOCUMENTS

| 8,271,757 | B1 | 9/2012 | Chatterjee | |
|---|---|---|---|---|
| 9,053,121 | B2 | 6/2015 | Amit | |
| 9,813,500 | B2* | 11/2017 | Mason | ............... H04L 41/0816 |
| 9,886,314 | B2* | 2/2018 | Borowiec | ............ G06F 9/5016 |
| 10,108,644 | B1 | 10/2018 | Wigmore | |
| 10,210,024 | B2* | 2/2019 | Bhimani | ................ G06F 9/455 |
| 10,261,782 | B2 | 4/2019 | Suarez | |
| 2013/0262762 | A1 | 10/2013 | Igashira | |

(Continued)

FOREIGN PATENT DOCUMENTS

WO    2017106726 A1    6/2017

OTHER PUBLICATIONS

Mulholland, et al., "Storage Allocation Enhancement of Microservices", U.S. Appl. No. 16/543,659, filed Aug. 19, 2019, 36 pages.

(Continued)

*Primary Examiner* — Ryan Bertram
(74) *Attorney, Agent, or Firm* — Brian M. Restauro; Christopher M. Pignato

(57) ABSTRACT

Method and system are provided for storage allocation enhancement of microservices. A method carried out at a microservice orchestrator, includes: identifying distinct phases of a run of a microservice container; categorizing the phases of a run of a microservice container, wherein the categorization defines a predicted storage behavior of the microservice container input/output operations in the phase of the microservice container; and providing the categorization in association with the microservice container input/output operations in the phase to a storage system for use in storage allocation of the input/output operations.

19 Claims, 11 Drawing Sheets

(56) References Cited

U.S. PATENT DOCUMENTS

| | | | |
|---|---|---|---|
| 2016/0378564 A1* | 12/2016 | Gaurav | G06F 9/45558 718/1 |
| 2017/0060609 A1* | 3/2017 | Cropper | G06F 16/285 |
| 2017/0199770 A1* | 7/2017 | Peteva | G06F 9/5088 |
| 2017/0359271 A1* | 12/2017 | Koh | H04L 47/70 |
| 2018/0349168 A1* | 12/2018 | Ahmed | G06F 11/3433 |
| 2019/0121541 A1 | 4/2019 | Zhao | |
| 2019/0245766 A1* | 8/2019 | Onoue | H04L 41/5009 |
| 2020/0167199 A1* | 5/2020 | Zur | G06N 20/00 |
| 2020/0379907 A1* | 12/2020 | Rostykus | G06F 9/3851 |
| 2021/0055862 A1 | 2/2021 | Mulholland | |
| 2021/0089361 A1* | 3/2021 | Rafey | G06F 9/45558 |

OTHER PUBLICATIONS

Mell et al., "The NIST Definition of Cloud Computing", Recommendations of the National Institute of Standards and Technology, NIST Special Publication 800-145, Sep. 2011, 7 pages.

\* cited by examiner

US 11,561,706 B2

STORAGE ALLOCATION ENHANCEMENT OF MICROSERVICES BASED ON PHASES OF A MICROSERVICE RUN

BACKGROUND

The present invention relates to storage allocation of microservices, and more specifically, to enhancement of storage allocation based on phases of a microservice run.

Microservices are a software development mechanism designed to decouple applications from their implementations. There are various benefits to this design philosophy, notably, encouraging modularity, scalability and architecture-independent design. In recent years there has been a particular rise of containerization as means of implementing and orchestrating microservice oriented architectures. For example, Kubernetes™ (Kubernetes is a trademark of The Linux Foundation) is an open-source container orchestration system for automating application deployment, scaling and management. It works with a range of container tools including Docker™ (Docker is a trademark of Docker, Inc.).

Docker™ is a tool which packages applications as something close to lightweight virtual machines, that ideally become environment agnostic. An example of something which may be containerized may be a database. Significantly, one can specify the associated storage. In Kubernetes™, the Container Storage Interface is used to implement a provisioning layer from which volumes can be created. Volumes can be provisioned and made accessible to nodes and snapshot operations performed. Docker™ and similar technologies are referred to herein as microservice orchestrators.

In filesystems, a location for a file is typically allocated on-the-fly from a storage allocator. In block storage, one can either provision by allocating the whole amount of capacity necessary for a volume in one pass (full allocation), or only allocate what is required at the time, and use forward-lookup structures to point at the location where the data is stored. Thin provisioning is typically the basis of sophisticated storage efficiency tools such as compression or deduplication.

SUMMARY

According to an aspect of the present invention there is provided a computer-implemented method for storage allocation enhancement of microservices, wherein the method is carried out at a microservice orchestrator and comprises: (i) identifying distinct phases of a run of a microservice container; (ii) categorizing the phases of a run of a microservice container, wherein the categorization defines a predicted storage behavior of the microservice container input/output operations in the phase of the microservice container; and (iii) providing the categorization in association with the microservice container input/output operations in the phase to a storage system for use in storage allocation of the input/output operations.

According to a further aspect of the present invention there is provided a system for storage allocation enhancement of microservices at a microservice orchestrator comprising: (i) a processor and a memory configured to provide computer program instructions to the processor to execute the function of the components: (ii) a phase identifying component for identifying distinct phases of a run of a microservice container; (iii) a phase categorizing component for categorizing the phases of a run of a microservice container, wherein the categorization defines a predicted storage behavior of the microservice container input/output operations in the phase of the microservice container; and (iv) a category providing component for providing the categorization in association with the microservice container input/output operations in the phase to a storage system for use in storage allocation of the input/output operations.

According to a further aspect of the present invention there is provided a computer program product for storage allocation enhancement of microservices, the computer program product comprising a computer readable storage medium having program instructions embodied therewith, the program instructions executable by a processor at a microservice orchestrator to cause the processor to: (i) identify distinct phases of a run of a microservice container; (ii) categorize the phases of a run of a microservice container, wherein the categorization defines a predicted storage behavior of the microservice container input/output operations in the phase of the microservice container; and (iii) provide the categorization in association with the microservice container input/output operations in the phase to a storage system for use in storage allocation of the input/output operations.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings. Preferred embodiments of the present invention will now be described, by way of example only, with reference to the following drawings in which:

DETAILED DESCRIPTION

Figure 1:
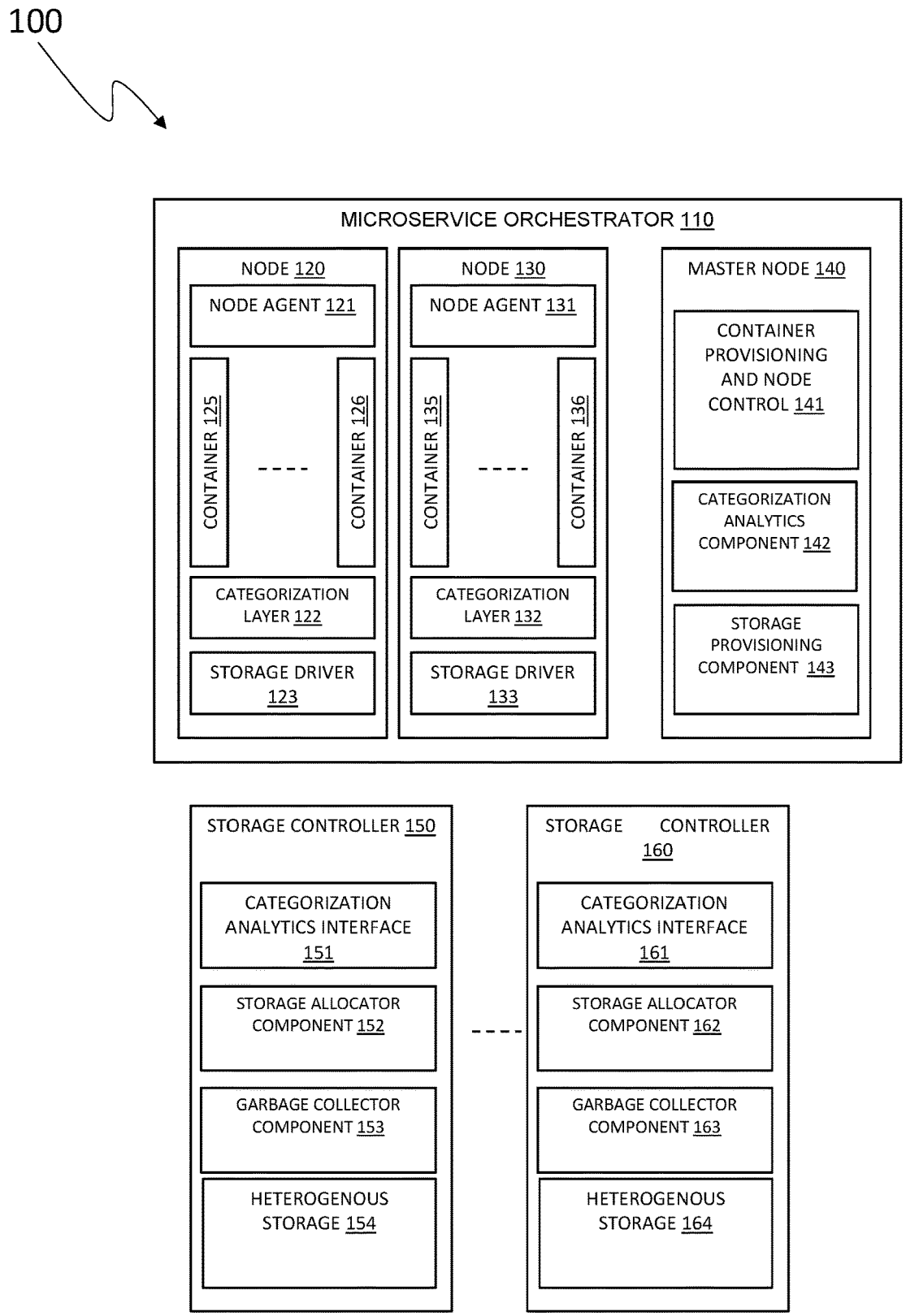
FIG. 1 is a block diagram of a microservice orchestrator and storage controller in which the described methods and systems may be implemented, in accordance with an embodiment of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Storage allocation enhancement of microservices is described by categorizing phases over time of a microservice container. The categorization defines a predicted storage behavior of the microservice container input/output operations, and a reference to the categorization is provided in association with the microservice container input/output operations of a phase to a storage system for use in storage allocation of the input/output operations.

Input/output operation patterns of containers have effects on efficient storage allocation and garbage collection of invalidated capacity in a storage system. The input/output operation patterns may be categorized based on storage characteristics that influence their storage behavior including garbage collection behavior. The described method and system provide a storage profile for a container that is divided into phases over time to enhance the storage behavior to accommodate the different phases.

The described method and system modify container storage profiles to factor in events which the orchestrator may have knowledge of or, alternatively, using a storage profile history to attempt to identify distinct behavior clusters at phases of the container lifespan. A given container image is likely to have more than one storage category that is provided to the storage controller to factor in behavior changes over time.

In this way, the categorization profiles a given container's storage access behavior, such that future instances of phases of a container have their storage assigned to storage that optimizes performance and garbage collection behavior. The term category is used to include a combination of storage characteristics that may be taken into consideration for storage allocation and garbage collection.

Profiling is performed by a microservice orchestrator, such as a hypervisor, and categorizes phases of a microservice according to storage characteristics of input/output operations, for example, how random storage access is, the amount of processor time waiting for storage access, duration of data (how long data lives until it is overwritten), the compressibility of the data in question, and the like.

An underlying microservice image may be provided with a profile that includes a categorization of phases, and an instance of a microservice may be initially categorized based on categorization of the underlying microservices image and adapted based on a context of the microservice container. The categorization of the phases of the underlying microservices image may be based on historical storage behavior and/or user configured categorization.

The use of phases is based on the likelihood that a container will operate with different behavior at various parts of its lifecycle. At a minimum, the access profile the container has while being initialized, and the access profile the container has while operating are likely to be very different. For example, core container/operating system files are likely to be significantly more durable, or have very different access patterns, compared to the standard workload.

The microservice orchestrator tracks the storage access behavior associated with the lifecycle of the container image. Storage access profiling of phases of container images is performed by the container orchestrator, with transitions between behavior profiles of phases being detected and transferred to the storage controller in order to make more intelligent storage allocation decisions.

As the container using a particular image transitions to a different phase of the profile and therefore, a different behavior, the storage controller is notified and alters future storage access behavior accordingly.

Referring to FIG. 1, a block diagram shows an example embodiment of a system 100 in which the described method and system may be provided. System 100 includes a microservice orchestrator 110, storage controller 150, and storage controller 160 of storage systems used by the microservice orchestrator 110.

Microservice orchestrator 110 (for example, a Kubernetes system) may provide a platform for automating deployment, scaling, and operations of microservice containers across clusters of hosts. Cloud services may offer a microservice orchestrator Platform as a Service or Infrastructure as a Service (PaaS or Iaas) on which microservice orchestrator 110 may be deployed as a platform-providing service.

Microservice orchestrator 110 may include node 120, node 130, and a master node 140. Master node 140 is the controlling unit that manages the workload and direct communication across the system. Master node 140 includes container provisioning and node control 141, categorization analytics components 142, and storage provisioning component 143 (which acts as a container storage interface where volumes can be created and provisioned).

Node 120 is a machine which includes node agent 121, container 125, container 126, categorization layer 122, and storage driver 123. A microservice image is a file comprised of multiple layers used to execute code in a container. An image is built from the instructions for a complete and executable version of an application and when an image is run by a container runtime, it becomes one or multiple instances of that container. Container 125 and container 126 are deployed by a container runtime. Storage driver 123 provides for communication with storage provisioning component 143 in master node 140, storage controller 150, and storage controller 160. Node 130 is substantially similar to node 120.

Storage controller 150 includes storage allocator component 152 for allocating storage in heterogenous storage 154 and storage allocator component 152 interfaces with the storage provisioning component 143 of master node 140 of microservice orchestrator 110. Storage controller 150 also includes garbage collector component 153 for reclaiming storage space and categorization analytics interface 151. Storage controller 160 is substantially similar to storage controller 150.

The described method and system use categorization of microservice container input/output operations to storage controller 150 and storage controller 160 to aid storage allocator component 152, storage allocator component 162 (respectively), garbage collector component 153, and garbage collector 163 in performing optimally for the characteristics of the container input/output operations. Node 120 and node 130 include categorization layer 122 and categorization layer 132 (respectively) that interacts with categorization analytics component 142 of master node 140 which in turn interacts with categorization analytics interface 151 and categorization analytics interface 161 of storage controller 150 and storage controller 160 (respectively). In the described method and system, the categorization is carried out for phases of a run of a microservice container.

Figure 2A:
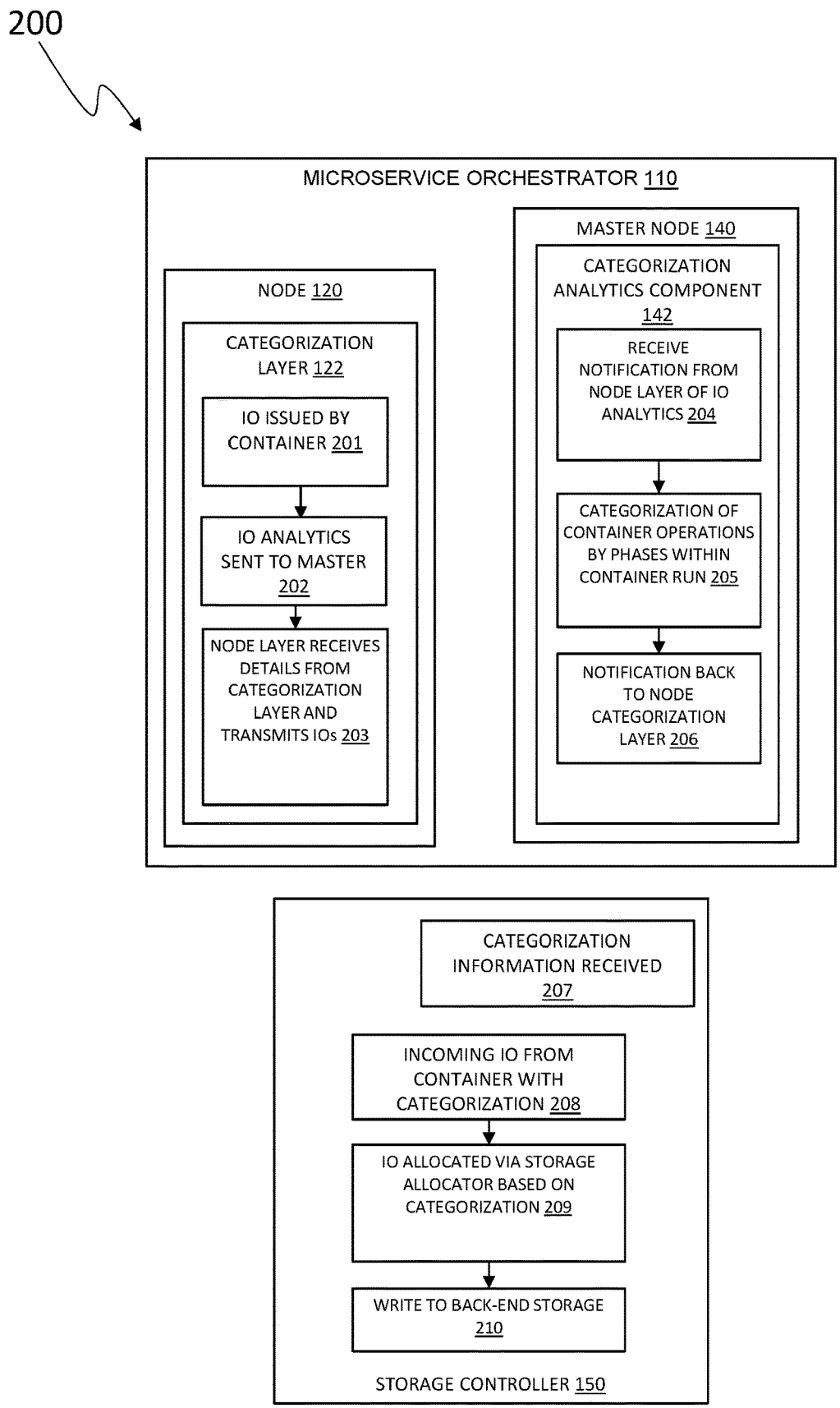
FIG. 2A is a flow diagram of an example embodiment of an aspect of a method in accordance with the present invention at a microservice orchestrator and a storage controller, in accordance with an embodiment of the present invention.

Referring to FIG. 2A, a block diagram 200 shows an example embodiment of the flow between node 120, master node 140 of microservice orchestrator 110, and also to storage controller 150.

Input/output operations are issued at step 201 by container 125 at node 120 and categorization analytics of the operations are gathered by node 120 and are communicated at step 202 by node categorization layer 122 to categorization analytics component 142 in master node 140 to provide and adjust categorization of a container.

Categorization analytics component 142 informs the individual node of the categorization that a given container belongs to and the individual node informs the master node of any changes to input/output patterns associated with a container enabling the master node to change categorizations accordingly.

Categorization analytics component 142 receives at step 204 a notification from a node layer of an input/output pattern for a container, identifies phases of a run of a container and categorizes at step 205 the container operations in a phase, and sends at step 206 a notification back to node categorization layer 122. Master node 140 may send at step 205 container categorization information to storage controller 150 where it is received at step 207 for reference when receiving container input/output operations from the node 120.

Container 125 at node 120 may receive details from the categorization analytics component 142 of master node 140 and may send at step 203 the input/output operations for the container to storage controller 150 with the categorization information. As the categorization information may have already been provided by master node 140 to storage controller 150, for example, in the form of storage profiles, the input/output operations of the container may simply be tagged to identify the categorization information (i.e. a storage profile).

Storage controller 150 may receive at step 208 the incoming input/output operations for container 125 with the categorization information for a phase. The input/output operations are allocated at step 209 via storage allocator 150 based on the container categorization and are written at step 210 to the back-end storage.

In an alternative implementation, the individual nodes may provide categorization information for a phase of a given container to the storage controller. How the categorization is transmitted may be implemented in various ways from a microservice layer. The categorization information may describe a storage profile of storage characteristics or behavior that is received and understood by the storage controller in order to be applied during container input/output operations.

Figure 2B:
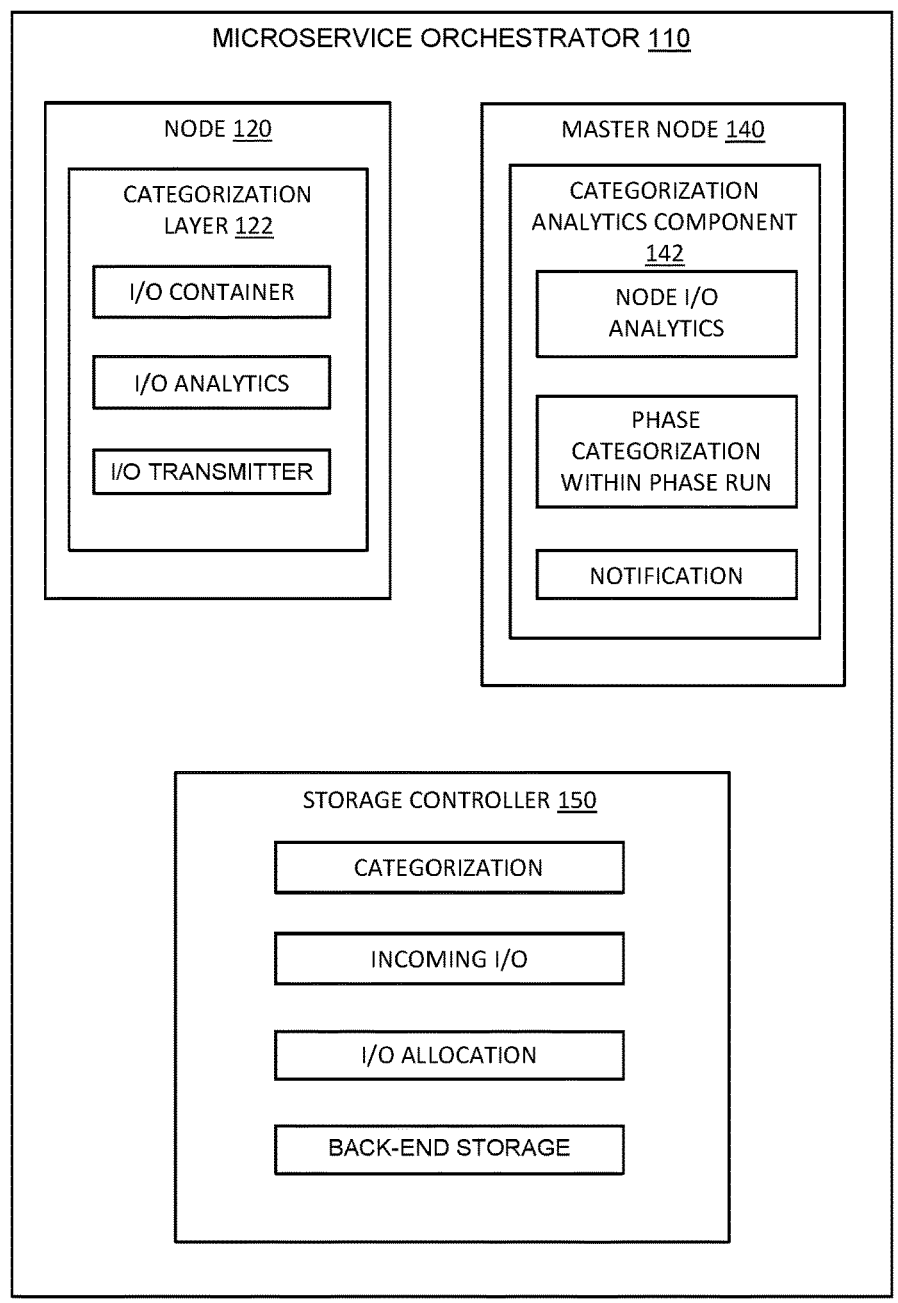
FIG. 2B is a block diagram of a microservice orchestrator and associated components, in accordance with an embodiment of the present invention.

Referring to FIG. 2B, a block diagram 250 showing a simplified version of FIG. 2A.

Figure 3A:
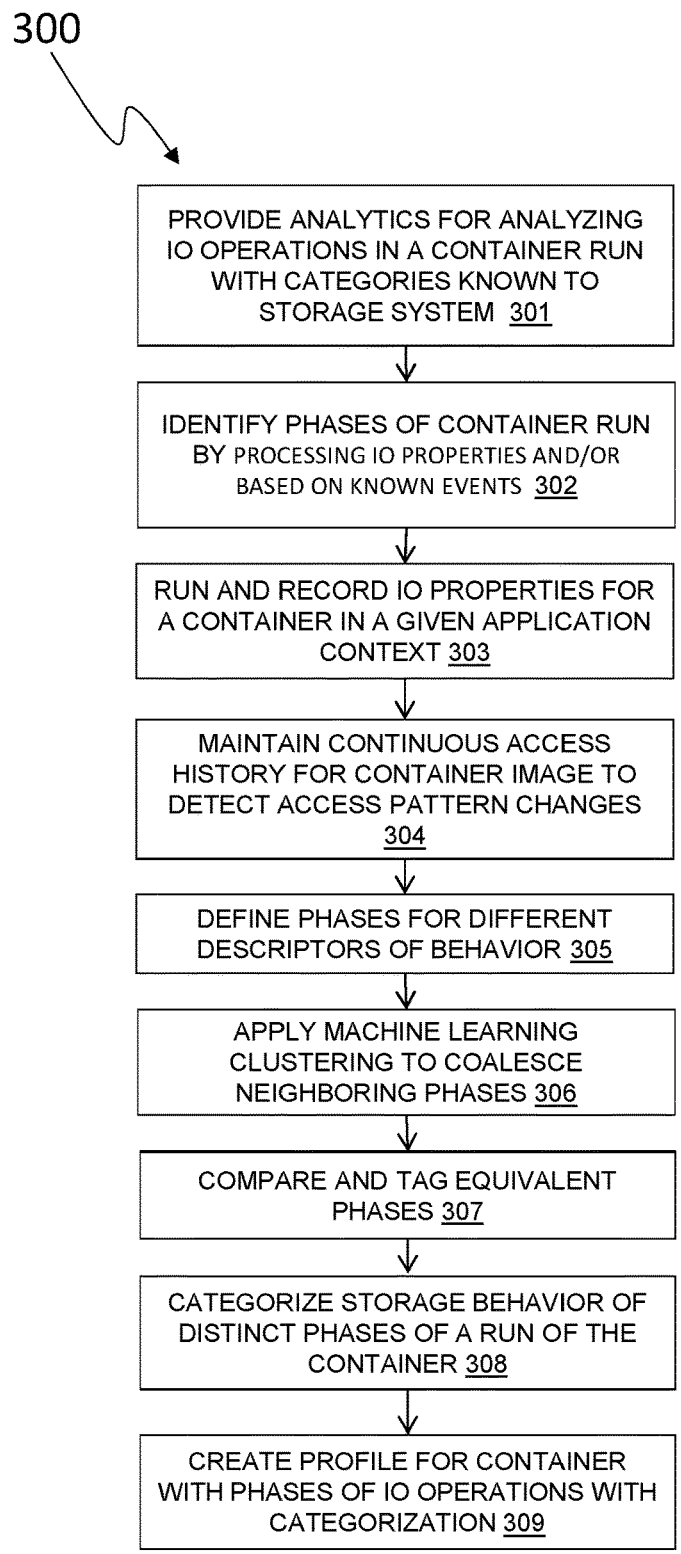
FIG. 3A and FIG. 3B are flow diagrams of an example embodiment of aspects of a method in accordance with the present invention as carried out at a microservice orchestrator, in accordance with an embodiment of the present invention.

Referring to FIG. 3A, a flow diagram 300 shows an example embodiment of an aspect of the described method carried out at microservice orchestrator 110 to allocate phases in a lifetime container 125 and allocate storage behavior categories to the phases.

The method provides at step 301 analytics functionality for analyzing input/output operations to identify phases of a run of a microservices container such as container 125 in node 120 in microservice orchestrator 110 and to categorize the operations in accordance with a storage profile of storage characteristics of operations in a phase.

The categories are shared with a storage controller of the storage system so that the storage controller can apply storage allocation and garbage collection based on a categorization provided with the input/output operations. The details of the different categorizations for storage profiles are transferred to the storage controller from the container orchestrator to tell the storage controller how different categories for storage profiles are likely to behave and to allow the storage controller to make the best allocation decisions for efficient storage and garbage collection. The profile for a container image including phases with categorization may be shared with the storage controller so that the storage controller is aware of an order of phases in a container run.

The method may identify at step 302 phases of a container run by processing recorded input/output properties or based on events known to the orchestrator in a container run.

In one embodiment, details of the container known to the orchestrator are leveraged. For example, initialization of a container is distinct from being connected to a data producing service and being actively utilized. Under such an embodiment, the method may create two profiles: one for the initialization phase and one for the data phase.

In another embodiment, which may be in addition or as an alternative to leveraging the known container details, the microservice orchestrator may track the storage access behavior associated with the lifecycle of the container. The method may run and record at step 303 input/output properties for a container in a given application context. This may be carried out as an initial run to gather storage behavior data as feedback from the storage system and may also record subsequent runs to update storage behavior data for refinement.

The orchestrator may maintain at step 304 a continuous access history for a given container image in order to detect access pattern changes and to define distinct periods of behavior as phases.

Input/output operation properties in storage systems may include one or more of the group of storage characteristics of: incompressible data, highly compressible data, short lifetime data, long lifetime data, random access pattern data, sequential access pattern data, fully allocated range, and application waiting profiles for operations. Analyzing input/output operation patterns may uses machine learning techniques to cluster the characteristics into distinct patterns of behavior that may be categorized.

Each phase must be sufficiently distinct from another phase so that detecting the difference between access patterns can be determined quickly and easily during a run of a container.

Each phase must also be sufficiently long that the storage controller is able to benefit from changing storage behavior. There will be a period where the container is writing data belonging to the new phase under the storage profile of the old phase until the storage controller is notified; the phase must be long enough that the overheads associated with writing to the "wrong" storage profile is outweighed by the benefits.

For example, if the behavior is about to transition from a broadly sequential access pattern to a broadly random one, there will be a short time when random access data is written in the sequential stream until the orchestrator is able to detect the difference and react accordingly. It may be better to combine the profiles to achieve a middle ground if the transition between sequential and random happens rapidly and frequently. If, for example, it is observed that the working set for a given image significantly expands after a given period, it can be determined that this is a distinct phase for the image. Phases may be defined at step 305 for different combinations of descriptors: compressibility, throughput, randomness, working set size I/O size, amongst other behavior trivially able to be determined by the orchestrator.

Machine learning clustering techniques can be applied at step 306 to identify phases based on I/O history sequences. If, for example, it is assumed that each minute of operation is a potential phase, neighboring phases can be clustered if they are sufficiently similar. Based on this, phases can coalesce into larger phases until distinct borders are found between phase clusters. Other approaches may also be leveraged to discover and define phases.

Phases may be compared and tagged as equivalent at step 307 if they are substantially similar. This may occur as behavior repeats itself over time after a given intermediate event.

The method may categorize at step 308 the phases of a run of a microservice container. The categorization defines a predicted storage behavior of the microservice container input/output operations in the phase of the microservice container. In this way, a storage profile is created at step 309 with sub-profile phases, with each phase having input/output operations with a categorized predicted storage behavior understood by the storage system.

The context identification of a container may be leveraged to identify whether an image used in a given context is distinct from a different context using the same image. For example, whether or not a database container is the same as a prior database container may depend on tagging, pod-context, etc. For example, a database image used in a finance application context may have a different profile from the same database image used in a non-finance application context.

When a pod or application context is available, the difference between a container image operating in different contexts may be determined based on what the container image is connected to. The application context allows it to recognize what it is connected to, for example, a data service, that is a life-event for the container and may indicate a new phase.

Categorization may be carried out for phases of a container using the following methods to gather the storage characteristics by various methods.

The methods include identifying whether or not a workload is sequential/random. Compressibility of a workload and data duration can be identified through sampling. Explicit user tagging can be used to classify a container phase as having certain properties. Tagging can occur at the classifier level by suggesting that this is similar to a prior historic process explicitly or tagging can occur at the property level stating explicitly how long a phase is likely to exist and what its input/output properties are. For example, if it is known that to run a database for a given workload and a similar expected workload is created using a different database, this may be acknowledged in order to benefit from prior history made with otherwise unrelated container images.

The categorization process may include initially categorizing a phase of a microservice container based on the categorization of the underlying microservices image, which may be based on historical storage behavior. The categorization of the underlying microservices image may alternatively be based on a user configured categorization. If a user is observing poor storage behavior, a user-defined configuration may be used to fine-tune the behavior.

This categorization may also include adapting an initial categorization of a phase based on a current context of the microservice container. This leverages categorization based on the context and may include user-based tagging of microservice containers to aid categorization. This may also include higher-level context analysis based on what other services are attached to the storage service. A higher-level context analysis may be based on a classification of the microservice container as belonging to a group of containers and the historic behavior patterns of the group. The group may be a pod in the form of a collection of microservice containers which are co-located on hardware and which share resources or the group may be a service in which pods work together.

The orchestrator may achieve categorization of a phase of a container run for a context in the following ways.

When a container is being spun-up, it is typically done so within a wider application context. A pod is a collection of containers which should be co-located on hardware and which share resources and a service is a wider classifier and specifies the pods which work together. When a service or a pod is created, each storage using container can be classified as part of a given service, or part of a given pod, and have the historic behavior of the contexts associated with them. Machine learning categorization techniques can be used to identify which is most relevant to the performance profile of a phase of a given container. Labels can also typically be associated with containers, which in turn can be leveraged to aid classification.

Topological approaches to attempt to classify phases of a container may be used. If a given service is considered as a collection of nodes (potentially with different types of nodes based on the context of use), with pod/service membership determining edges, a given phase of a container can be classified based on what the container is attached to through graph-analysis algorithms. Based on the graph-analysis, it is possible to determine what the behavior of the container will be based on the behavior of the nearest historic match. Various network-motif classification mechanisms have been explored through bioinformatic techniques and one of the most common applications of the mechanisms is identifying similar structures in bioinformatic networks.

Machine learning categorization techniques may be used to identify a category which is most relevant to the performance profile of the microservices container.

The method may include ongoing analysis of input/output operations of a microservice container to update the categorization.

Categorization analytics may be gathered from an individual node for a current container process within the microservice orchestrator. For example, a node can tell whether or not a current workload is roughly random or roughly sequential. The container orchestrator may be informed of the input/output patterns occurring on a given container and may compile this information into its categorization.

A container may be subject to the nature of a user's workload that can change. For example, it may start significantly sequential as data is written for the first time, but it may become highly random/transactional as different user workloads are activated. By performing phase analysis, it is possible to change a categorization for a container.

Once a profile has been created for a run of a container, the storage controller is notified of the categories of properties of each phase associated with the profile. These categories may be described in terms of characteristics; for example, a category for long-lived, incompressible data and a category for short-lived, highly compressible data.

When a container first runs, the storage controller is notified of the category to use, and that this is the initial phase. As the container using an image transitions to a different phase and therefore, a different behavior profile, the storage controller is notified and alters future storage access behavior accordingly.

When an input/output operation is sent to the storage controller, the storage controller may be informed of a given category for a phase or may be informed of a phase for which the storage controller knows a category to use. This allows the storage controller to place it on a storage medium best suited for this access pattern, and in a location that is best suited for its expected duration.

Figure 3B:
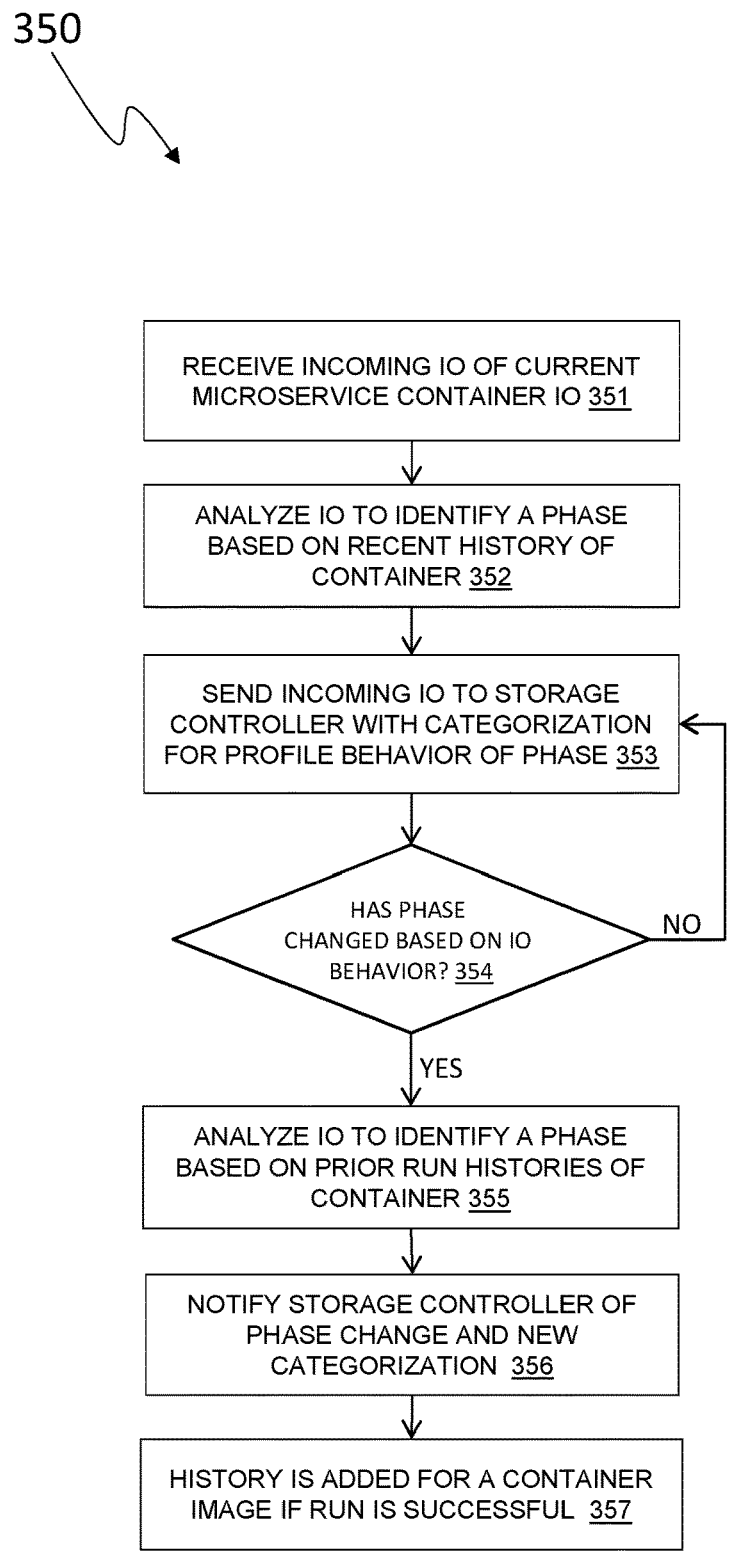

Referring to FIG. 3B, a flow diagram 350 shows an example embodiment of an aspect of the described method carried out at a microservice orchestrator 110 during a runtime of a container such as container 125 or container 126.

The method at the orchestrator may receive at step 351 microservice container input/output operations issued by container 125 at runtime and input/output operation storage characteristics and may analyze at step 352 the input/output operations to identify a current phase of container 125. The orchestrator may leverage the recent history of input/output operations to determine which phase the current input/output properties are most likely to belong to.

The input/output operations are sent at step 353 to storage controller 150 with categorization for a given profile for a phase. Alternatively, the input/output operations may be sent with an identified phase for which storage controller 150 knows the appropriate categorization. This allows storage controller 150 to place it on a storage medium best suited for this access pattern, and in a location that is best suited for its expected duration.

It may be determined at step 354 if a phase has changed based on input/output operation behavior in order to detect transitions between phases. If the input/output operation behavior is sufficiently distinct from the current phase's behavior and is similar to another phase's behavior, a transition is performed. If a phase change is detected, the method may analyze at step 355 the input/output operation to identify a new phase. Storage controller 150 is notified at step 356 of the phase change with the input/output operations and alters its storage allocation behavior.

For a given image of container 125, history is added at step 357 to the existing history with each successful run. The method can then periodically re-evaluate what phases exist for that given image and improve access profile behavior accordingly as more container 125 information becomes available.

Containers with heterogenous storage access behavior over time will be able to be more correctly profiled, resulting in performance and garbage collection efficiencies. This, in turn, will result in improved application performance and improved storage medium lifetimes (for example, as garbage collection becomes more efficient).

The following are some storage allocation techniques that may be used based on the categorization information that is provided with the input/output operations of the container. An overall goal is to try to allocate high-performing storage only when it is required.

Categorization of storage patterns may include measures of randomness, measures of expected longevity of data, measures of whether or not the system in question is waiting on input/output operations, what is the expected working set for a given set of input/output operations, measures of input/output size, required failure resistance, and other storage characteristics that affect the storage and garbage collection optimization.

A category may inform the storage controller that the phase of the container is likely to create incompressible data and, based on this category, the storage controller should not attempt to compress the input/output operations. Conversely, the category may inform the storage controller that the phase of the container is likely to create highly compressible data and, based on this category, should preferentially allocate compression bandwidth to the data range phases.

A category may inform the storage controller that a phase of a container is likely to have a short lifetime; i.e., the data is likely to be discarded soon. Based on this category, the storage controller may attempt to group together short-lived data through allocating separate regions for these shorter-lived ranges.

A category may inform the storage controller that a phase is likely to have a very long lifetime. Categorization may enable these long-lived data ranges to be allocated to common extents. By avoiding mixing these long-lived ranges with short-lived ranges, unnecessary garbage collection is avoided to free up the short-lived ranges. This results in using less write bandwidth for garbage collection, which in turn improves performance and storage media longevity.

For particularly hostile workloads, categorization of a phase will ensure that the storage controller will allocate data ranges to fully allocated (i.e., non-log-structured-array) ranges, as the overhead of garbage collecting these ranges may be excessive. This will result in more optimal performance. If a container contains a phase that would allocate to fully allocated storage, the data range in question should be allocated from fully allocated storage during the initial phase, rather than waiting for the hostile workload phase to trigger.

For systems which have significant random input/output patterns compared to sequential ones, selecting storage which best responds to this behavior may result in a more optimal response than picking the fastest storage available.

A category may inform the storage controller that a phase of a container is likely to have a random-access pattern. Based on the category, the storage controller allocates these data ranges to extents which will likely perform optimally for this workload (e.g., solid-state drives). The result of this is that these systems are subject to improved performance.

A category may inform the storage controller that a phase of a container is likely to have a sequential access pattern. Based on the category, the storage controller allocates these data ranges to extents which will likely perform optimally for this workload (potentially hard disk drives). The result of this is allocating storage to more optimal candidates for the workload, both improving performance for the hard disk drives, and leaving more solid-state drive capacity free for use for workloads which will benefit them most.

A category may inform the storage controller that the phase of the container is likely to be subject to waiting for input/output operations for significant periods of time. The storage controller may assign faster storage media to these ranges, optimizing workflows on the containers.

A given workload may have a working set, which is the range of data that receives heavy input/output operations. Categories may be used to keep working sets that are similar together making garbage collection work more efficient.

The benefits of such a system are that this results in optimized storage placement, resulting in reduced garbage collection overheads. This in turn reduces load on storage systems and provides better host input/output operation performance.

Figure 4:
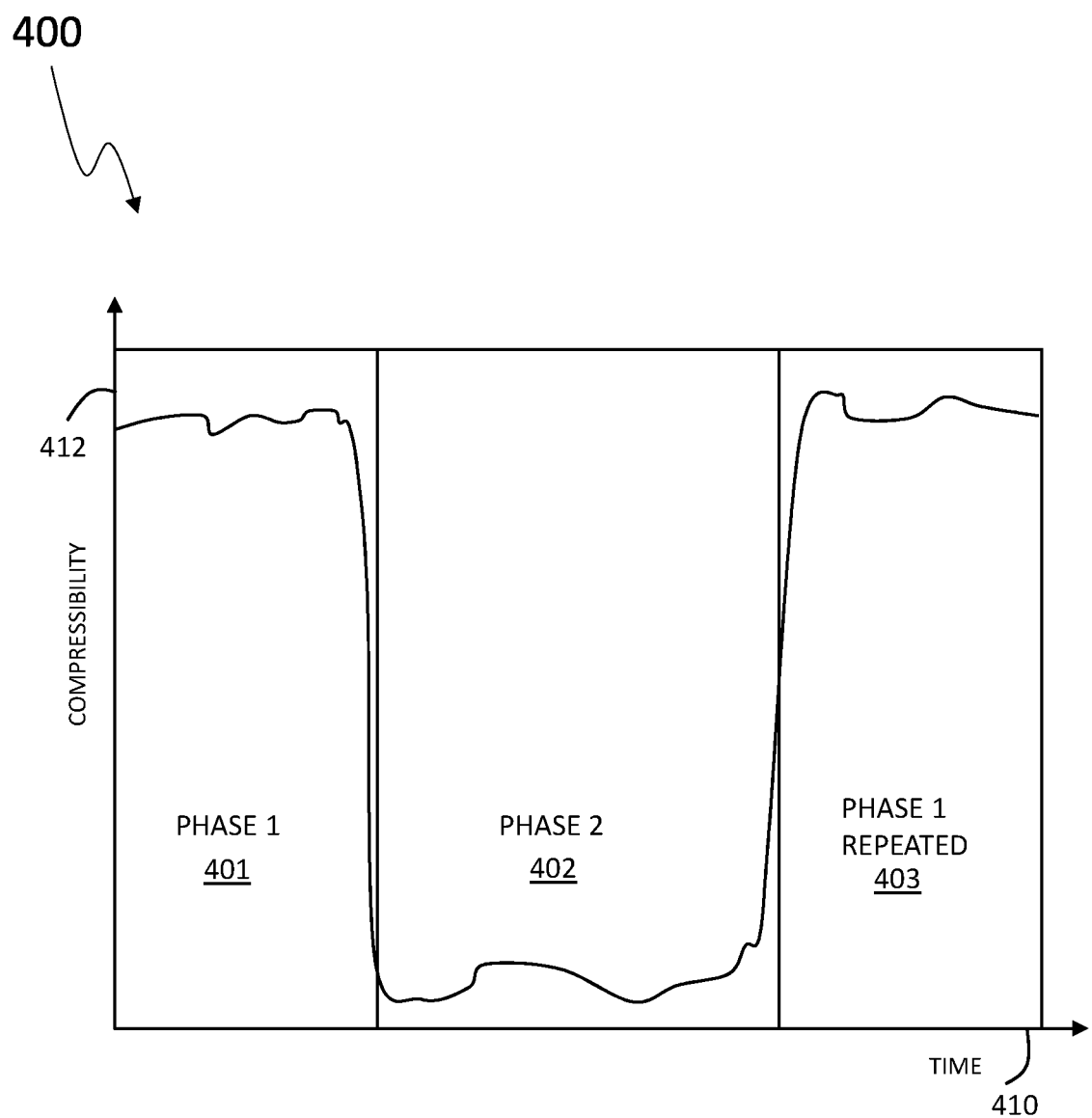
FIG. 4 is a schematic diagram of a storage characteristic over time of a container illustrating phases in accordance with an aspect of the present invention, in accordance with an embodiment of the present invention.

Referring to FIG. 4, a schematic diagram 400 shows first phase 401, second phase 402, and third phase 403 over time 410 of compressibility 412 of data of a container. First phase 401 shows a high level of compressibility, second phase 402 shows a low level of compressibility, and third phase 403 reverts to the level of compressibility of first phase 401. This can be extended to different input/output descriptors, cardinalities of descriptors, and groups of phases.

Figure 5:
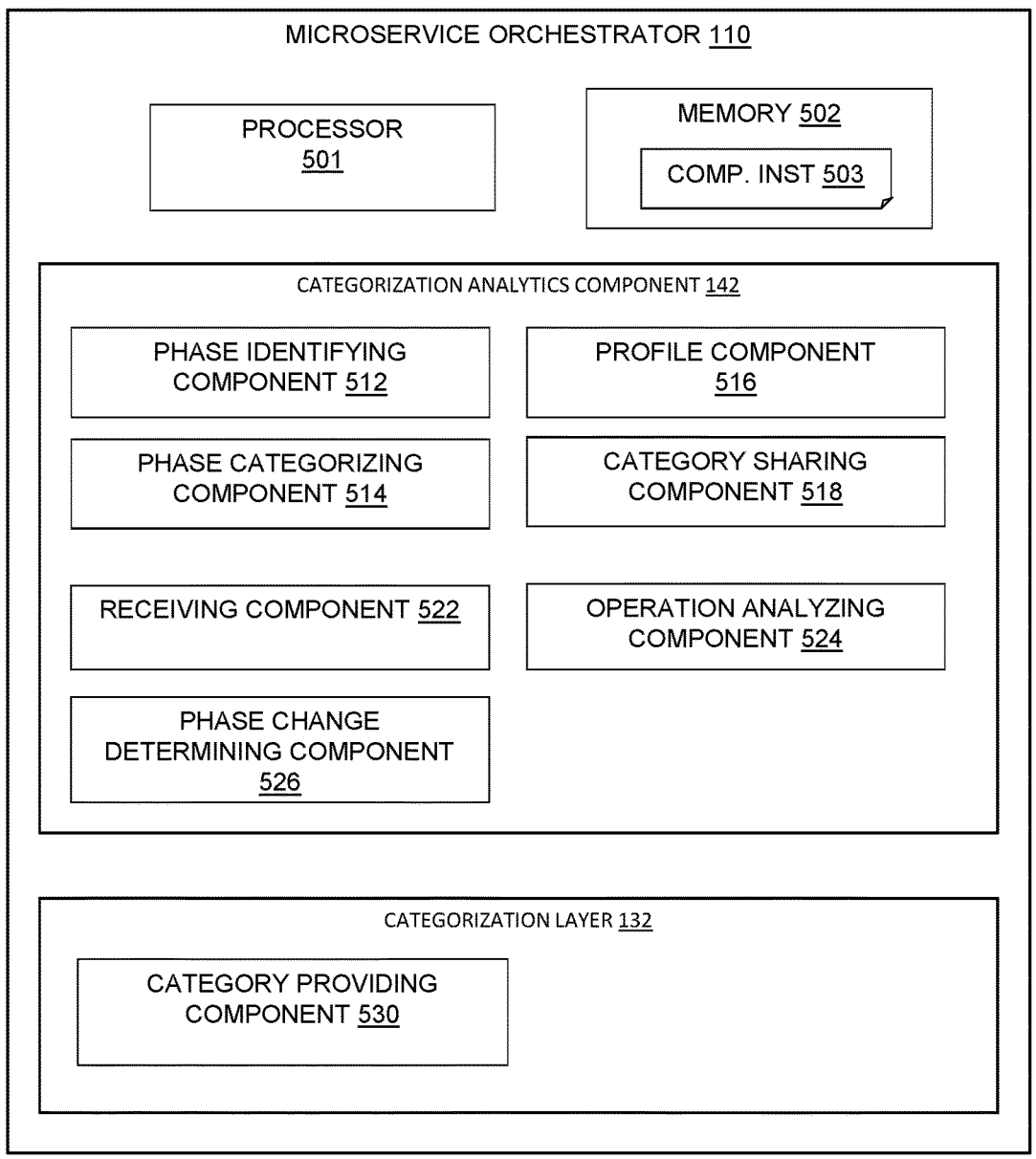
FIG. 5 is a block diagram of an example embodiment of an aspect of a system in accordance with the present invention at a microservice orchestrator, in accordance with an embodiment of the present invention.

Referring to FIG. 5, a block diagram 500 shows an example embodiment of microservice orchestrator 110 which includes categorization analytics component 142 (of a master node), categorization layer 132 (of a node), processor 501, and memory 502. These are shown on a single system but may be distributed across multiple systems including a hardware module or a circuit for executing the functions of the described components which may be software units executing on at least one processor such as processor 501. Multiple processors running parallel processing threads may be provided enabling parallel processing of some or all the functions of the components. Memory 502 may be configured to provide computer instructions 503 to processor 501 to carry out the functionality of the components.

Categorization analytics component 142 may provide categorization analytics for analyzing input/output operation patterns in storage systems to categorize phases of a microservice container run. The categorization analytics are used to categorize input/output operations of a microservice container at runtime.

Categorization analytics component 142 may include phase identifying component 512 for identifying distinct phases of a run of a microservice container. Phase identifying component 512 may leverage knowledge of a previous run of a microservice container known to the microservice orchestrator and/or may process a history of runs of a container to detect patterns of storage characteristics to identify phases of the container. Phase identifying component 512 may apply Machine Learning clustering of input/output operations with similar storage behavior characteristics into a phase. Phase identifying component 512 may identify phases in different application contexts and may also balance a length of a phase with a cost of changing categorization for input/output operations at the storage system.

Categorization analytics component 142 may include phase categorizing component 514 for categorizing the phases of a run of a microservice container and profile component 516 for creating and storing a profile for a microservice container image with distinct phases with categories.

Categorization analytics component 142 may include category sharing component 518 for sharing categories for phases with a storage controller.

Categorization analytics component 142 may include receiving component 522 for receiving microservice container input/output operations issued by the microservice container at runtime, operation analyzing component 524 for analyzing the input/output operations to identify the operations as belonging to a phase of a microservice container run, and phase change determining component 526 to determine when operations belong to a different phase based on the analysis of the operations.

Categorization layer 132 at a node may include category providing component 530 for providing a categorization of a phase in association with the microservice container input/output operations in the phase to a storage system for use in storage allocation of the input/output operations.

Figure 6:
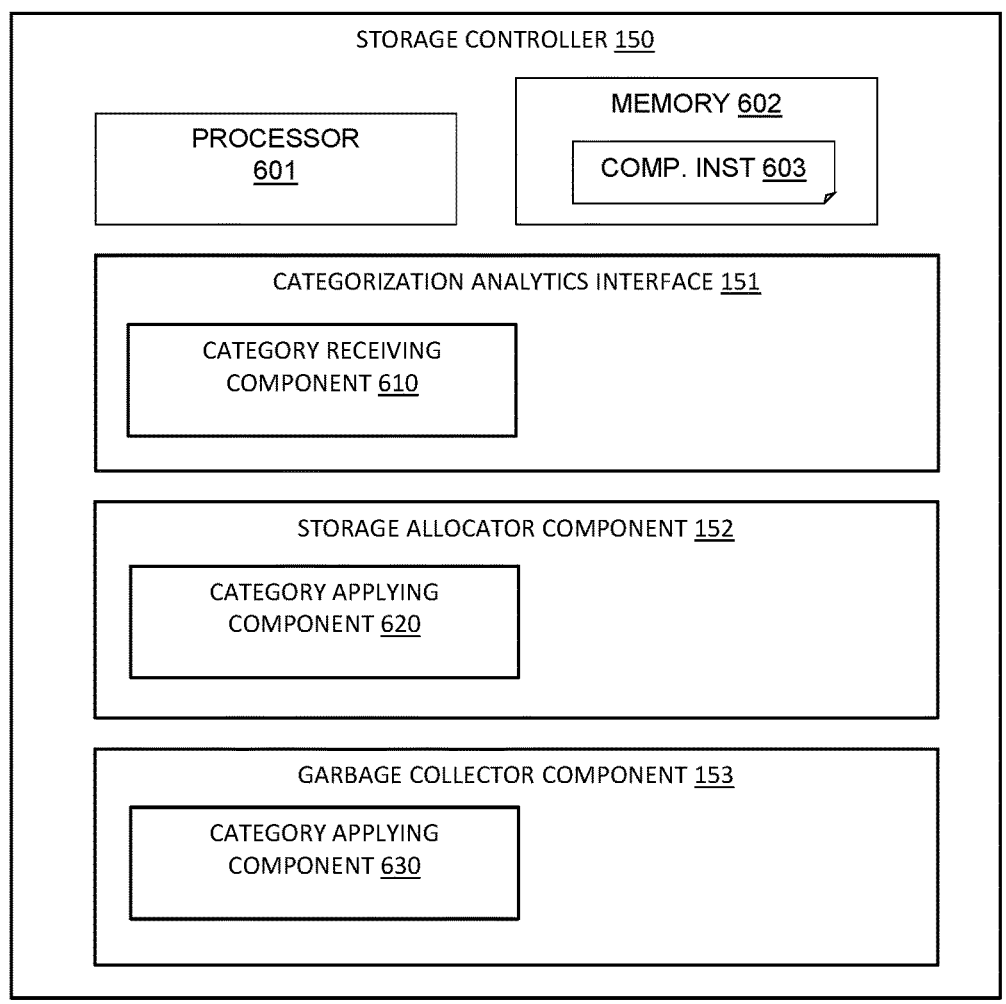
FIG. 6 is a block diagram of an example embodiment of an aspect of a system in accordance with the present invention at a storage controller, in accordance with an embodiment of the present invention.

Referring to FIG. 6, a block diagram 600 shows an example embodiment of storage controller 150 which includes categorization analytics interface 151, storage allocator component 152, and garbage collector component 153. Storage controller 150 may include at least one processor 601, a hardware module, or a circuit for executing the functions of the described components which may be software units executing on the at least one processor. Multiple processors running parallel processing threads may be provided enabling parallel processing of some or all the functions of the components. Memory 602 may be configured to provide computer instructions 603 to the at least one processor 601 to carry out the functionality of the components.

Categorization analytics interface 151 may include category receiving component 610 for receiving microservice container input/output operations with an associated categorization that defines a predicted storage behavior of a current phase of microservice container input/output operations.

Storage allocator component 152 may include category applying component 620 for using the associated categorization for optimizing storage allocation for the input/output operations.

Garbage collector component 153 may include category applying component 630 for using the associated categorization for optimizing garbage collection performance.

Figure 7:
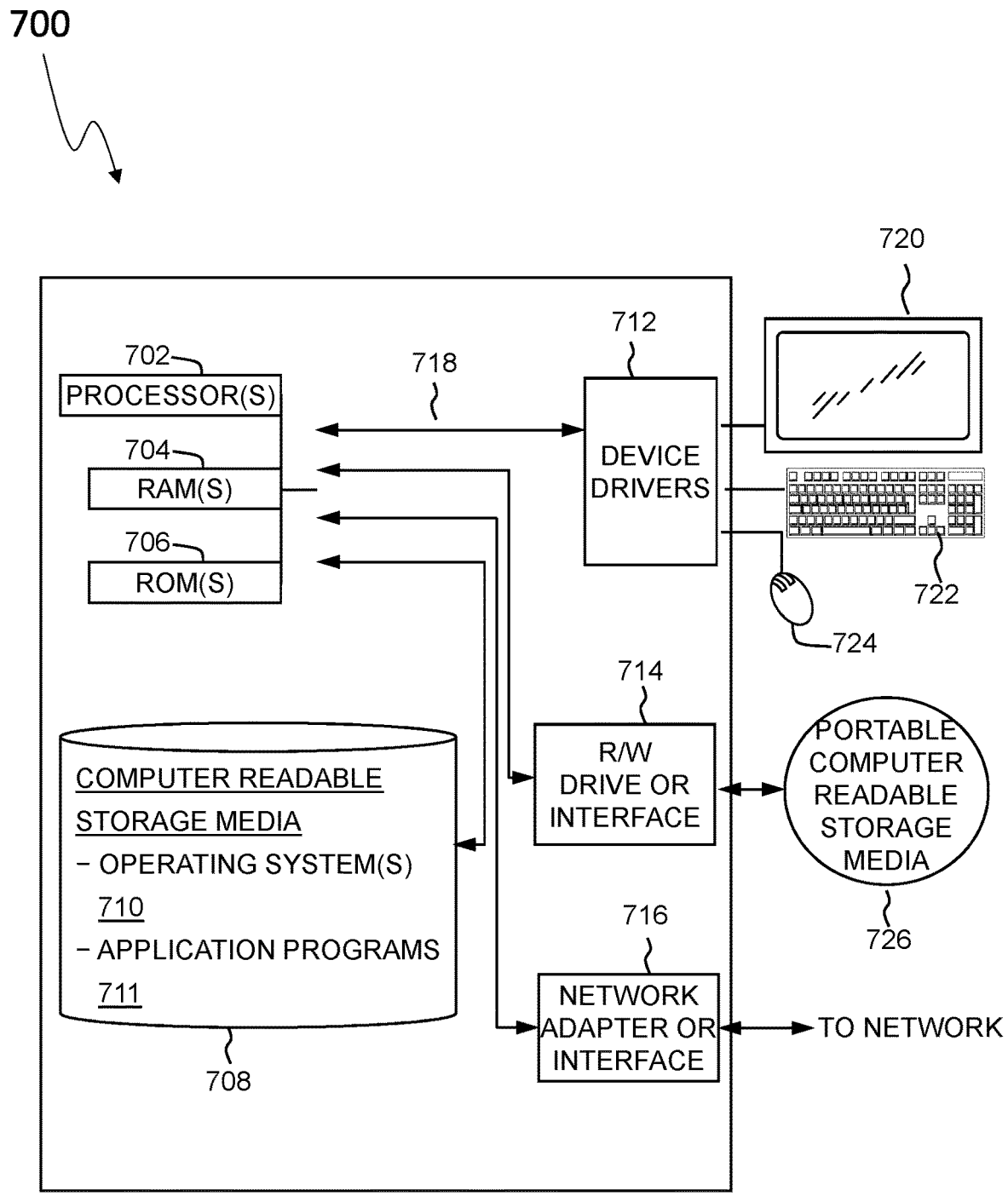
FIG. 7 is a block diagram of an embodiment of a computer system or cloud server in which the present invention may be implemented, in accordance with an embodiment of the present invention.

FIG. 7 depicts a block diagram of components of a computing device 700 of the system 100 of FIG. 1 such as microservice orchestrator 110 or storage controller 150, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing device 700 can include one or more processors 702, one or more computer-readable RAMs 704, one or more computer-readable ROMs 706, one or more computer readable storage media 708, device drivers 712, read/write drive or interface 714, and network adapter or interface 716, all interconnected over communications fabric 718. Communications fabric 718 can be implemented with any architecture designed for passing data and/or control information between processors (such as microprocessors, communications and network processors, etc.), system memory, peripheral devices, and any other hardware components within the system.

One or more operating systems 710, and application programs 711, are stored on one or more of the computer readable storage media 708 for execution by one or more of the processors 702 via one or more of the respective RAMs 704 (which typically include cache memory). In the illustrated embodiment, each of the computer readable storage media 708 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 700 can also include R/W drive or interface 714 to read from and write to one or more portable computer readable storage media 726. Application programs 711 on computing device 700 can be stored on one or more of the portable computer readable storage media 726, read via the respective R/W drive or interface 714, and loaded into the respective computer readable storage media 708.

Computing device 700 can also include network adapter or interface 716, such as a TCP/IP adapter card or wireless communication adapter. Application programs 711 on computing device 700 can be downloaded to computing device 700 from an external computer or external storage device via a network (for example, the Internet, a local area network, or other wide area networks or wireless networks) and network adapter or interface 716. From network adapter or interface 716, application programs 711 may be loaded into computer readable storage media 708. The network may comprise copper wires, optical fibers, wireless transmission, routers, firewalls, switches, gateway computers and edge servers.

Computing device 700 can also include display screen 720, keyboard or keypad 722, and computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. Device drivers 712, R/W drive or interface 714, and network adapter or interface 716 can comprise hardware and software stored in computer readable storage media 708 and/or ROM 706.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
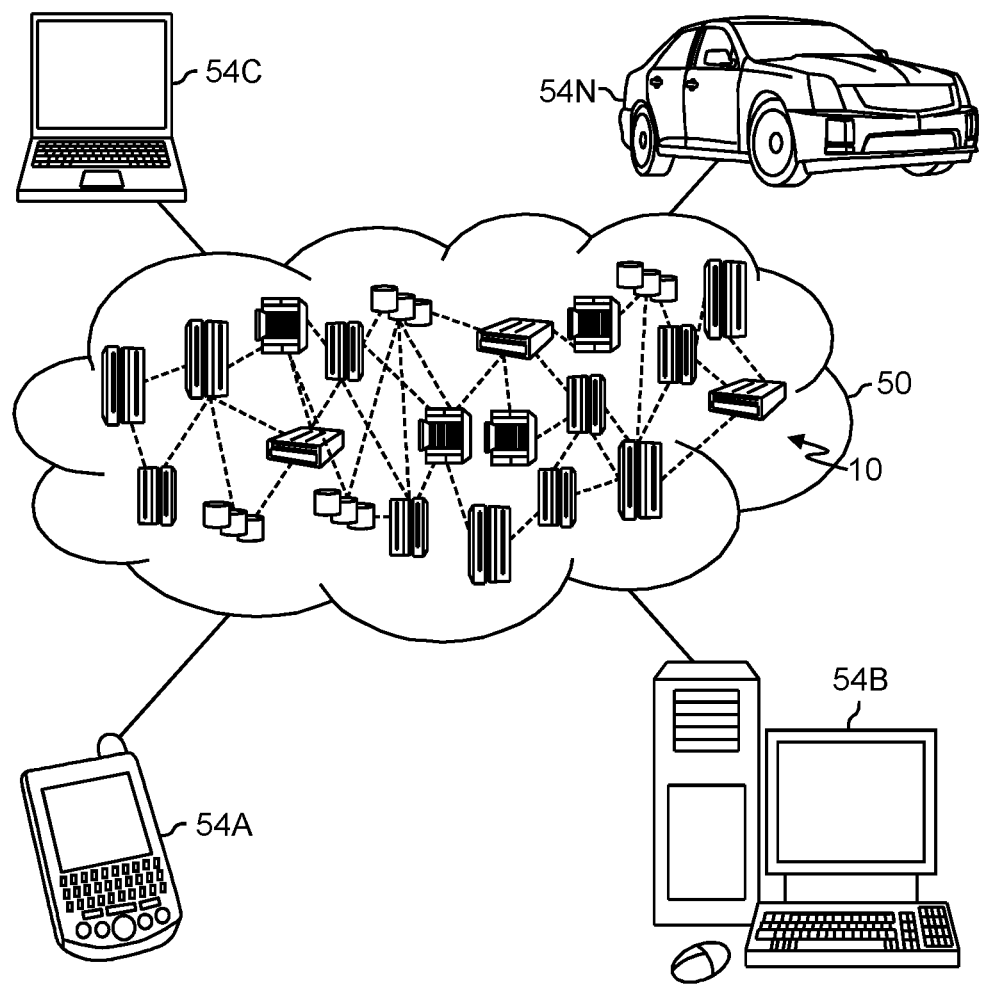
FIG. 8 depicts a cloud computing environment, in accordance with an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
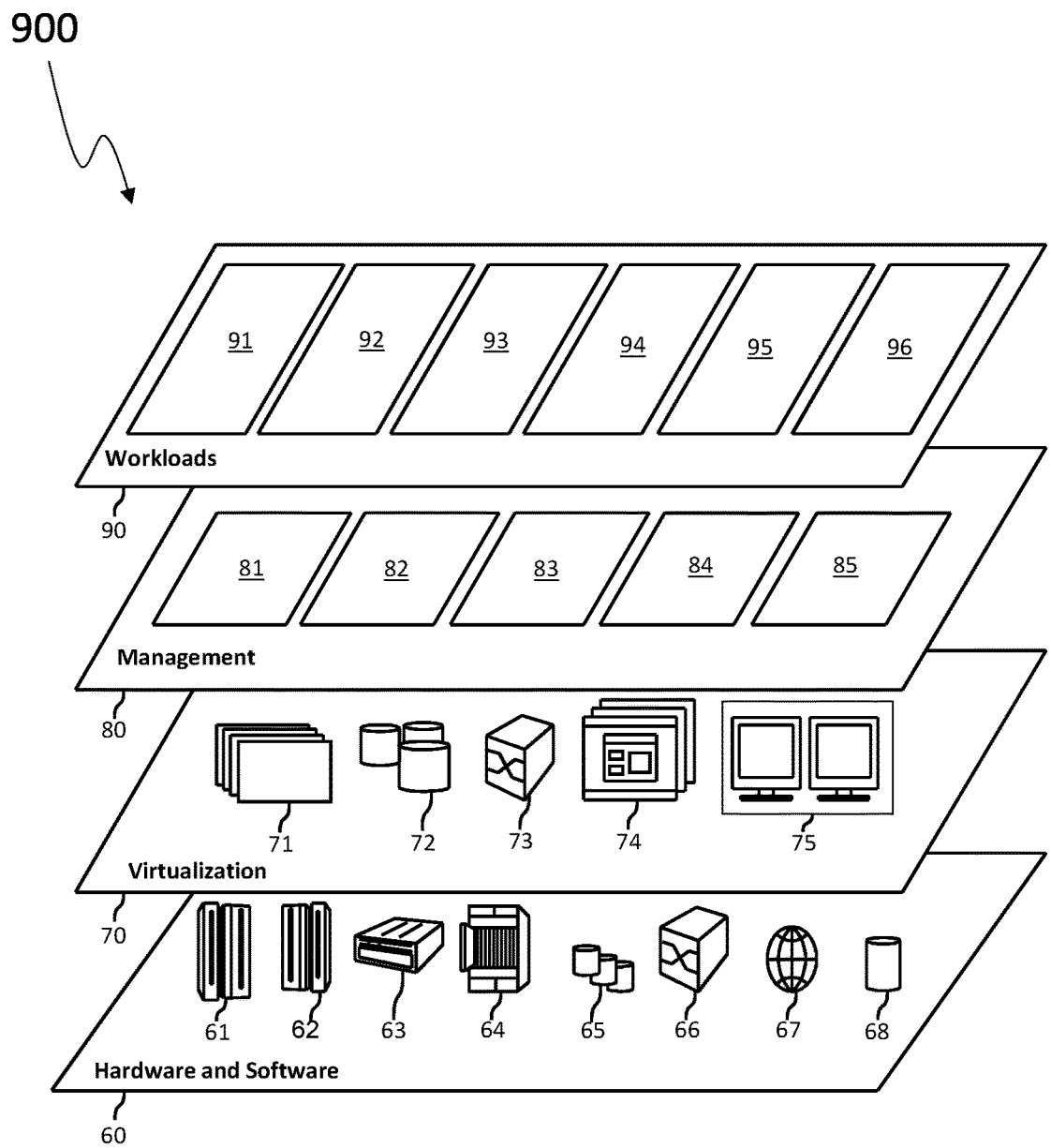
FIG. 9 depicts abstraction model layers, in accordance with an embodiment of the present invention.

Referring now to FIG. 9, a set of functional abstraction layers 900 provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container storage optimization processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for storage allocation enhancement of microservices, the method comprising:
   identifying, by one or more computer processors, one or more distinct phases of a run of a microservice container within a microservice orchestrator according to storage characteristics of input/output operations of the microservice container, wherein the storage characteristics identifying the distinct phases of the run include randomness of storage access, amount of processor time waiting for storage access, duration of data or compressibility of the data;
   categorizing, by one or more computer processors, the one or more distinct phases of the run of a microservice container, wherein the categorization defines a predicted storage behavior of input/output operations of the microservice container in a first phase of the one or more distinct phases of the microservice container;
   providing, by one or more computer processors, the categorization in association with the microservice container input/output operations in the first phase to a storage system for use in storage allocation of the input/output operations;
   sharing, by one or more computer processors, categories for the one or more distinct phases with a storage controller, wherein a category determines a type of storage allocation for an input/output operation associated with a categorization; and
   grouping, based on the categories for the one or more distinct phases, short-lived data together by allocating regions for shorter-lived ranges and enabling long-lived data ranges to be allocated to common extents, avoiding the mixing of the long-lived ranges with the short-lived ranges, lessening an amount of write bandwidth used for garbage collection of the short-lived ranges.

2. The method of claim 1, wherein identifying one or more distinct phases of a run of a microservice container includes leveraging knowledge of a previous run of the microservice container known to the microservice orchestrator.

3. The method of claim 1, wherein identifying one or more distinct phases of a run of a microservice container includes processing a history of runs of the microservice container to detect patterns of storage characteristics to identify the one or more distinct phases of the container.

4. The method of claim 1, wherein identifying one or more distinct phases of a run of a microservice container

19 identifies a plurality of distinct phases of a plurality of container runs in different application contexts.

5. The method of claim 1, wherein identifying one or more distinct phases of a run of a microservice container includes balancing a length of a phase with a cost of changing categorization for input/output operations at the storage system.

6. The method of claim 1, wherein identifying one or more distinct phases of a run of a microservice container includes defining one or more phases for different combinations of storage behavior characteristics.

7. The method of claim 1, wherein identifying one or more distinct phases of a run of a microservice container includes applying Machine Learning clustering of input/output operations with similar storage behavior characteristics into the one or more distinct phases.

8. The method of claim 1, wherein identifying one or more distinct phases of a run of a microservice container includes comparing and tagging a plurality of equivalent phases of similar storage behavior characteristics.

9. The method of claim 1, wherein identifying one or more distinct phases of a run of a microservice container comprises creating and storing a profile for a microservice container image with distinct phases with categories.

10. The method of claim 1, further comprising:
receiving and analyzing, by one or more computer processors, input/output operations to determine a current phase of a run of a microservice container; and
monitoring, by one or more computer processors, incoming input/output operations during the run of a microservice container for a change in phase based on the analysis of the operations.

11. A computer system for storage allocation enhancement of microservices at a microservice orchestrator, the computer system comprising:
one or more computer processors;
one or more computer readable storage media; and
program instructions stored on the one or more computer readable storage media for execution by at least one of the one or more computer processors, the program instructions comprising:
program instruction to identify one or more distinct phases of a run of a microservice container within a microservice orchestrator according to storage characteristics of input/output operations of the microservice container, wherein the storage characteristics identifying the distinct phases of the run include randomness of storage access, amount of processor time waiting for storage access, duration of data or compressibility of the data;
program instructions to categorize the one or more distinct phases of the run of a microservice container, wherein the categorization defines a predicted storage behavior of input/output operations of the microservice container in a first phase of the one or more distinct phases of the microservice container;
program instructions to provide the categorization in association with the microservice container input/output operations in the first phase to a storage system for use in storage allocation of the input/output operations;
program instructions to share categories for the one or more distinct phases with a storage controller, wherein a category determines a type of storage allocation for an input/output operation associated with a categorization; and

20 program instructions to group, based on the categories for the one or more distinct phases, short-lived data together by allocating regions for shorter-lived ranges and enabling long-lived data ranges to be allocated to common extents, avoiding the mixing of the long-lived ranges with the short-lived ranges, lessening an amount of write bandwidth used for garbage collection of the short-lived ranges.

12. The system of claim 11, wherein the program instructions to identify one or more distinct phases of a run of a microservice container includes leveraging knowledge of a previous run of the microservice container known to the microservice orchestrator.

13. The system of claim 11, wherein the program instructions to identify one or more distinct phases of a run of a microservice container includes processing a history of runs of the microservice container to detect patterns of storage characteristics to identify the one or more distinct phases of the container.

14. The system of claim 11, wherein the program instructions to identify one or more distinct phases of a run of a microservice container includes identifying a plurality of distinct phases of a plurality of container runs in different application contexts.

15. The system of claim 11, wherein the program instructions to identify one or more distinct phases of a run of a microservice container includes applying Machine Learning clustering of input/output operations with similar storage behavior characteristics into the one or more distinct phases.

16. The system of claim 11, further comprising program instructions stored on the one or more computer readable storage media for execution by at least one of the one or more computer processors, to:
include a profile component for creating and storing a profile for a microservice container image with distinct phases with categories.

17. The system of claim 11, further comprising program instructions stored on the one or more computer readable storage media for execution by at least one of the one or more computer processors, to:
include a category sharing component for sharing categories for phases with the storage controller.

18. The system of claim 11, further comprising program instructions stored on the one or more computer readable storage media for execution by at least one of the one or more computer processors, to:
receive and analyze input/output operations to determine a current phase of a run of a microservice container; and
monitor incoming input/output operations during the run of a microservice container for a change in phase based on the analysis of the operations.

19. A computer program product for storage allocation enhancement of microservices, the computer program product comprising
one or more computer readable storage media; and
program instructions stored on the one or more computer readable storage media, the program instructions comprising:
program instruction to identify one or more distinct phases of a run of a microservice container within a microservice orchestrator according to storage characteristics of input/output operations of the microservice container, wherein the storage characteristics identifying the distinct phases of the run include randomness of storage access, amount of processor time waiting for storage access, duration of data or compressibility of the data;

program instructions to categorize the one or more distinct phases of the run of a microservice container, wherein the categorization defines a predicted storage behavior of input/output operations of the microservice container in a first phase of the one or more distinct phases of the microservice container;

program instructions to provide the categorization in association with the microservice container input/output operations in the first phase to a storage system for use in storage allocation of the input/output operations;

program instructions to share categories for the one or more distinct phases with a storage controller, wherein a category determines a type of storage allocation for an input/output operation associated with a categorization; and program instructions to group, based on the categories for the one or more distinct phases, short-lived data together by allocating regions for shorter-lived ranges and enabling long-lived data ranges to be allocated to common extents, avoiding the mixing of the long-lived ranges with the short-lived ranges, lessening an amount of write bandwidth used for garbage collection of the short-lived ranges.

* * * * *